United States Patent
Carstensen et al.

(10) Patent No.: US 9,458,752 B2
(45) Date of Patent: Oct. 4, 2016

(54) HEAT EXCHANGE DEVICE AND DRIVE UNIT FOR A MOTOR VEHICLE

(71) Applicant: VOLKSWAGEN AKTIENGESELLSCHAFT, Wolfsburg (DE)

(72) Inventors: Asmus Carstensen, Osloss (DE); Artur Semke, Wolfsburg (DE); Thomas Schulenburg, Isenbüttel (DE); Andreas Herr, Wolfsburg (DE); Jörg Fritzsche, Wolfsburg (DE); Marcus Dallmann, Meine (DE); Christoph Käppner, Braunschweig (DE); Jörg Volkmann, Bahrdorf (DE); Thomas Maischik, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 104 days.

(21) Appl. No.: 14/326,584

(22) Filed: Jul. 9, 2014

(65) Prior Publication Data
US 2015/0013335 A1    Jan. 15, 2015

(30) Foreign Application Priority Data

Jul. 9, 2013  (DE) .................. 10 2013 011 519

(51) Int. Cl.
*F28D 9/00* (2006.01)
*F01N 5/04* (2006.01)
(Continued)

(52) U.S. Cl.
CPC ................. *F01N 5/04* (2013.01); *F01K 23/10* (2013.01); *F01N 5/02* (2013.01); *F02G 5/02* (2013.01);
(Continued)

(58) Field of Classification Search
CPC ............ F01N 5/02; F01N 5/025; F01N 5/04; F01N 2240/02; F02G 5/02; F28D 9/0093; F01K 23/10
USPC .................................................... 60/320, 616
See application file for complete search history.

(56) References Cited

U.S. PATENT DOCUMENTS 6,142,221 A * 11/2000 Johansson ...................... 165/140
2011/0088397 A1 * 4/2011 Mori ...................... F01K 23/065
                                                                 60/661

(Continued)

FOREIGN PATENT DOCUMENTS

CN        1194029 A      9/1998
CN      102086821 A      6/2011

(Continued)

OTHER PUBLICATIONS

Extended European Search Report, issued Feb. 5, 2015, by the European Patent Office in connection with European Patent Application No. 14175150.3.

(Continued)

*Primary Examiner* — Audrey K Bradley
(74) *Attorney, Agent, or Firm* — Morey B. Wildes; Pearl Cohen Zedek Latzer Baratz LLP

(57) ABSTRACT

A heat exchange device having a first media channel for a first medium and a second media channel for a second medium is further refined in that, in at least one section of the heat exchange device, a third media channel for a transfer medium is arranged between the first media channel and the second media channel, so that the heat transfer from the first medium to the second medium takes place via the transfer medium.

5 Claims, 4 Drawing Sheets

(51) Int. Cl.
*F01K 23/10* (2006.01)
*F02G 5/02* (2006.01)
*F01N 5/02* (2006.01)

(52) U.S. Cl.
CPC ......... *F28D 9/0093* (2013.01); *F01N 2240/02* (2013.01); *Y02T 10/16* (2013.01); *Y02T 10/166* (2013.01)

(56) References Cited

U.S. PATENT DOCUMENTS

| | | |
|---|---|---|
| 2011/0131961 A1 | 6/2011 | Lee et al. |
| 2012/0090293 A1* | 4/2012 | Barrieu .......................... 60/273 |
| 2012/0151938 A1 | 6/2012 | Przybylski |
| 2013/0037235 A1 | 2/2013 | Sakabe et al. |

FOREIGN PATENT DOCUMENTS

| | | |
|---|---|---|
| CN | 201909571 U | 7/2011 |
| CN | 102803887 A | 11/2012 |
| DE | 10 2007 033 611 A1 | 1/2009 |
| DE | 10 2008 013 650 A1 | 9/2009 |
| DE | 10 2009 028 467 A1 | 2/2011 |
| DE | 10 2009 035 522 A1 | 2/2011 |
| DE | 10 2010 038 314 A1 | 1/2012 |
| DE | 11 2010 001 357 T5 | 5/2012 |
| DE | 10 2010 055915 | 6/2012 |
| DE | 10 2011 076 054 A1 | 11/2012 |
| EP | 2 466 086 | 6/2012 |
| JP | 2012-107 599 A | 6/2012 |
| WO | WO 2004/ 042 310 A1 | 5/2004 |
| WO | WO 2012/125107 | 9/2012 |
| WO | WO2012/125107 A1 | 9/2012 |

OTHER PUBLICATIONS

German Search Report issued for German Patent Application No. DE 10 2013 011 519.1, mailed Oct. 17, 2013.

Search Report for Chinese Patent Application No. 201410321604.6, mailed Mar. 25, 2016.

* cited by examiner

HEAT EXCHANGE DEVICE AND DRIVE UNIT FOR A MOTOR VEHICLE

CROSS REFERENCE TO RELATED APPLICATIONS

This application claims priority of German Patent Application DE 10 2013 011 519.1, filed Jul. 9, 2013, which is hereby incorporated by reference.

FIELD OF THE INVENTION

The invention relates to a heat exchange device as well as to a drive unit for a motor vehicle integrating such a heat exchange device.

Heat exchange devices in which a heat transfer from one medium to a second medium takes place without mixing these media are known from numerous technical applications.

In motor vehicles, for example, the main cooler of the engine coolant circuit is such a heat exchange device in which a heat transfer from the coolant of the engine coolant circuit to the ambient air takes place in order to prevent overheating of the engine coolant circuit and thus of the internal combustion engine as well as of other components of the motor vehicle that are cooled by the engine coolant circuit.

Aside from these and other uses, heat exchange devices in motor vehicles are also used in systems in which the thermal energy contained in the exhaust gas is utilized to generate mechanical power. Since the efficiency of reciprocating combustion machines, which are almost exclusively employed to power motor vehicles, amounts to only about one-third of the primary energy used, and the remaining two-thirds of the thermal energy released during the combustion is waste heat that is discharged to the environment as lost heat, either via the engine cooling system or via the exhaust gas system, this is a promising way to increase the overall efficiency of the drive unit of a motor vehicle and consequently to lower the consumption of fuel.

BACKGROUND OF THE INVENTION

German patent application No. DE 10 2009 028 467 A1 describes such a device for the utilization of waste heat from an internal combustion engine. For this purpose, a first heat exchanger, namely, the evaporator, of a steam cyclic device is integrated into the exhaust gas system of the internal combustion engine. The thermal energy transferred in the heat exchanger from the exhaust gas to a working medium of the steam cyclic device is partially converted in an expansion device into mechanical energy that can be used, for instance, to assist the drive of a motor vehicle or to generate electrical energy. Downstream from the expansion device, the working medium is cooled in a second heat exchanger, namely, the condenser, a process in which it condenses. A feed pump increases the pressure of the working medium and feeds it to the evaporator.

The condenser is cooled by the coolant of a coolant circuit of the internal combustion engine. The return line of the coolant from the condenser can be switched by means of a three-way valve in such a way that the coolant is fed into the engine coolant circuit either upstream from the main cooler or upstream from the internal combustion engine. As a result, the waste heat that is absorbed by the coolant in the condenser can be used during a warm-up phase of the internal combustion engine in order to more quickly warm up the coolant. Here, in a generally known manner, it is provided for the engine cooler to be bypassed via a bypass line in order to avoid an undesired cooling of the coolant during the warm-up phase. By using the waste heat that has accumulated in the condenser, the internal combustion engine more quickly reaches its operating temperature, a process that is associated with a low fuel consumption and few emissions during the warm-up phase. After the operating temperature has been reached, the coolant that has been warmed up by the condenser can be fed into the engine coolant circuit upstream from the engine cooler. As a result, it can be prevented that waste heat from the condenser reduces the cooling capacity available for the internal combustion engine. On the other hand, however, it can also be provided that coolant exiting from the condenser is fed into the engine coolant circuit directly upstream from the internal combustion engine once the operating temperature has been reached. This can be provided if the engine outlet temperature of the coolant falls below a setpoint value, which can happen, for example, when the motor vehicle has been driven downhill for a prolonged period of time. Moreover, then the heating capacity of an interior heater that is based on the exchange of heat with the engine coolant circuit can be improved.

It is likewise a known procedure to integrate heat storage tanks, especially latent or chemical heat storage tanks, into the engine coolant circuit (see, for example, German patent application DE 10 2008 013 650 A1). During the operation of the combustion machine, once the operating temperature has been reached, these heat storage tanks absorb heat and temporarily store it. After a subsequent cold start of the combustion machine, the heat storage tanks once again release the stored heat to the engine coolant circuit, as a result of which the warm-up phase of the combustion machine is shortened.

It is also a known procedure to combine both of these measures in a combustion machine, whereby there is no interaction between the steam cycle and the heat storage tank. The use of the heat storage tank here is a pure cold-start measure, whereas the steam cycle is only used once the operating temperature has been reached. A drawback of these systems is that the evaporator as well as the heat storage tank are both integrated into the exhaust gas system and they each have to have a bypass line in order to allow them to be bypassed so that, at least when they are not being used, there is a need to avoid the increase in the exhaust gas counter-pressure caused by the fact that the exhaust gas flows around the evaporator and the heat storage tank.

An alternative combination of a heat storage tank with a steam cycle for the utilization of waste heat from the exhaust gas is known from German patent application DE 10 2007 033 611 A1. In this document, during the operating states of the internal combustion engine in which the thermal energy contained in the exhaust gas is greater than the maximum amount of thermal energy in the evaporator that can be transferred to the working medium, the use of appropriately configured bypass lines and valves is provided so as to divert part of the exhaust gas flow to the heat storage tank in order to "charge" it, insofar as it is not already completely "charged". On the other hand, during the operating states of the internal combustion engine in which the thermal energy of the exhaust gas is less than the thermal energy that can be converted in the evaporator, it is provided that the exhaust gas is first fed through the heat storage tank in order to warm up the exhaust gas, as a result of which the steam cycle can then be carried out more effectively. In order to prevent this from causing an impermissible cooling of the exhaust gas treatment devices of the exhaust gas system, the heat storage tank as well as the evaporator are integrated into the exhaust gas downstream from these exhaust gas treatment devices.

A combustion machine that is functionally similar and that has a steam cyclic device is known from German patent application DE 10 2009 035 522 A1. There, a steam reservoir is integrated into the steam cyclic device, so that the steam can be temporarily stored in this steam reservoir during times when it has been generated but cannot be utilized. The stored steam is fed back into the steam cycle again when more steam can be converted than can be generated through the utilization of exhaust gas heat.

Another alternative combination of a heat storage tank with a steam cycle for the utilization of waste heat from the exhaust gas is known from German patent application DE 10 2011 076 054 A1. Here, it is provided for the heat storage tank to be integrated into the steam cycle and for it to be impinged with the working medium of the steam cycle. For this purpose, it is provided that a supply line to the heat storage tank is integrated into the steam cycle between the evaporator and the expansion device, while a return line is integrated into the steam cycle between the expansion device and the condenser. Fundamentally, this means that the heat transferred from the heat storage tank to the working medium after a cold start of the combustion machine should be transferred in the evaporator to the exhaust gas, as a result of which the heating time for exhaust gas treatment devices arranged in the exhaust gas system downstream from the evaporator can be shortened. Moreover, German patent application DE 10 2011 076 054 A1 discloses that, as an alternative or in addition to warming up the exhaust gas during the warm-up phase, it can also be provided that the waste heat from the condenser shortens the warm-up phase of the combustion machine in that the condenser is cooled by the coolant of the engine coolant circuit. When the working medium is utilized in such a way, it can also be provided for the pressure of the working medium to be adjusted by means of a pressure adjuster so that the steam phase is temporarily eliminated and the working medium circulates in the liquid state throughout the entire circuit.

Moreover, from the realm of combined heating systems for buildings, so-called three-medium heat exchangers are known in which two endothermic media—first of all water for a hot-water supply system and secondly, water for a heating system—are heated up by an exothermic medium that is heated up, for example, in a boiler of the heating system. In the case of these three-medium heat exchangers, a heat transfer from the exothermic medium to the two endothermic media takes place in parallel.

SUMMARY OF THE INVENTION

Before the backdrop of this state of the art, the invention was based on the objective of putting forward an improved device for utilizing the waste heat of a combustion machine.

This objective is achieved by a drive unit. A heat exchange device can be used, among other things, in such a drive unit description below. Advantageous embodiments of the heat exchange device according to the invention and of the drive unit according to the invention can be gleaned from the description of the invention provided below.

The invention is based on the realization that, in a drive unit of the generic type that is known from German patent application DE 10 2007 033 611 A1 and that has a combustion machine having an internal combustion engine as well as an exhaust gas system via which exhaust gas can be discharged from the internal combustion engine, and has a cyclic device that can be used to (temporarily) convert the thermal energy contained in the exhaust gas into mechanical work in a clockwise thermodynamic cycle, whereby the cycle comprises a (direct or indirect) heat transfer from the exhaust gas to a working medium in a first heat exchange device, as a result of which the temperature and/or the pressure of the working medium is increased, comprises an expansion of the working medium in an expansion device for generating the mechanical work, and comprises a (direct or indirect) heat transfer from the working medium to a cooling medium in a second heat exchange device, the heat transfer from the exhaust gas to the working medium can be associated with problems that require a complicated structural configuration of the heat exchange device employed here. This is particularly the case when the first heat exchange device is integrated directly into the exhaust gas system, as a result of which the exhaust gas flows around the line(s) of this heat exchange device that carry the working medium. The lines and the working medium carried in them might then be exposed to local temperatures of several hundred degrees. This poses not only a considerable challenge to the structural design of the first heat exchange device, but also to the working medium that is being used. For example, in drive units of the generic type, the clockwise cycle is normally configured as a steam cycle. The working media used for this purpose have to have evaporation and condensation temperatures that fall within relatively narrow limits. As a result, the organic working media that are frequently employed for this purpose have a relatively low degradation temperature that must not be exceeded during the cycle. In the case of ethanol, which is often used for such cycles, this temperature is, for instance, 361° C. [681.8° F.]. The useable range of media in the NOVEC group is even limited to below 300° C. [572° F.].

In order to prevent the working medium from reaching the degradation temperature, it is a known approach in the case of a drive unit of the generic type to use a bypass line so that the heat exchange device that is integrated into the exhaust gas system can be bypassed when the exhaust gas temperatures are too high. This configuration, however, eliminates the possibility to utilize the waste heat that is then generated, which has a detrimental effect on the overall efficiency of the drive unit.

The invention is based on the idea of circumventing the problem of high peak temperatures in that a direct heat transfer from the exhaust gas to the working medium is avoided to such an extent that the degradation temperature of the working medium is not reached, even at the highest exhaust gas temperature that occurs. Rather, the heat transfer takes place indirectly via a transfer medium, especially a transfer fluid and preferably a transfer liquid, which thus serves as a "heat damper". As a result, the heat transfer can be controlled (e.g. by changing the flow rate of the transfer medium) and consequently, any marked fluctuations that might occur in the heat supply in the exhaust gas can be "smoothed". Moreover, in this manner, it can be achieved that the heat transfer in the second heat exchanger, which preferably functions as an evaporator, can be operated at relatively constant inlet temperatures for the working medium and the transfer medium. This permits a good thermodynamic design of the evaporator since it is possible to relatively precisely locate the range of the so-called pinch point as well as the zone in which the phase of the working medium changes between the liquid and the gaseous phase.

This fundamental idea of the invention is implemented in a drive unit of the generic type in that such a first heat exchange device is used with a transfer medium for the indirect heat transfer from the exhaust gas to the working medium.

Such a heat exchange device can fundamentally have at least two heat exchangers that are spatially separated from each other, and that are connected via an intermediate circuit containing the transfer medium. Then, in one or more first heat exchangers, thermal energy would be transferred from the exhaust gas to the transfer medium, and in at least one second heat exchanger, thermal energy would be transferred from the transfer medium to the working medium. Here, the intermediate circuit can especially also have a compensation tank and/or a pump to circulate the transfer medium. Another advantage of such an intermediate circuit can lie in the fact that the waste heat from the exhaust gas is tapped at several places by means of several first heat exchangers. This can be done directly by arranging a heat exchanger in the exhaust gas flow, or else indirectly, for example, externally, on components that carry exhaust gas (for instance, an exhaust manifold, a cooler of an exhaust gas return line, especially a high-pressure exhaust gas return line) of the exhaust gas system (if applicable, also of the engine coolant circuit whose thermal energy also stems essentially from the exhaust gas).

The involvement of the transfer medium here allows additional advantages to be achieved. In particular, the possibility exists for the transfer medium to be virtually free of (excess) pressure in the intermediate circuit, as a result of which it can be avoided that a heat exchanger that is directly exposed to high exhaust gas temperatures also has to be configured so as to be high-pressure resistant. In the case of drive units of the generic type, this is usually the case since the working medium is fed to the heat exchangers, which are configured there as evaporators, at a pressure that is normally 25 bar to 30 bar. The structural complexity required for such heat-resistant as well as pressure-resistant heat exchangers can thus be avoided or reduced.

However, a heat exchange device having at least a first heat exchanger and a second heat exchanger that is structurally separated from the first one can be disadvantageous in terms of the installation space required.

This is avoided according to the invention in that the heat exchange device is configured in such a way that the heat of the thermal energy stemming from the exhaust gas first is first transferred to the transfer medium and from there to the working medium in a structural unit.

Accordingly, such a heat exchange device has (at least) a first media channel for a first—preferably exothermic—medium and (at least) a second media channel for a second—preferably endothermic—medium, whereby, in at least one section of the heat exchanger, (at least) a third media channel for a transfer medium is arranged between the first media channel and the second media channel, so that the heat transfer from the first medium to the second medium takes place via the transfer medium.

Although a preferred use of the heat exchange device according to the invention in a drive unit according to the invention is for a motor vehicle, it can fundamentally be used in any desired manner, especially if it is advantageous for an endothermic medium to be protected from peak temperatures of an exothermic medium.

A compact design and an especially good heat exchange can be achieved in that the heat exchange device is configured as a plate heat exchanger. Then, it can be provided that the second media channel and/or the third media channel is/are (each) formed in a plate, whereby the exothermic medium flows (at least partially) around the plate that forms the third media channel. Here, it can especially be provided that the second and/or the third media channel runs through the plate in question so as to be deflected several times (e.g. meander-like), in order to utilize the size of the plate for the heat exchange to the greatest extent possible.

In an especially preferred embodiment of the heat exchange device according to the invention, it can be provided that the third media channel for the transfer medium is arranged in only one section of the heat exchange device between the first and second media channels, whereas in another section, this is not the case, so that a heat transfer from the exothermic medium to the endothermic medium takes place directly (that is to say, without involving the transfer medium). In an embodiment of the heat exchange device as a plate heat exchanger, this can preferably be achieved in that the plate that forms the third media channel is smaller than the plate that forms the second media channel, so that, in one section, the exothermic medium flows around the plate that forms the second media channel.

In this manner, it can be achieved that the exothermic medium and the endothermic medium are only thermally separated as long as the exothermic medium has or might have an excessively high temperature under certain conditions. However, as soon as an adequate cooling of the exothermic medium has been achieved, the overall heat transfer in the heat exchange device can be improved through the direct transfer of heat to the endothermic medium.

It can also preferably be provided that the heat exchange device is operated as a counter-flow heat exchanger. Accordingly, the intended flow direction in the first media channel would be opposite to the intended flow direction in the second media channel.

Regarding the intended flow direction in the third media channel, it can be advantageous if it is the same as the intended flow direction in the second media channel.

In another preferred embodiment of the heat exchange device according to the invention, it can be provided that the second media channel widens in its intended flow direction. As a result, an expansion of the third medium caused by the warming up process can be taken into account. In particular, this can allow the configuration of the heat exchange device as an evaporator that is characterized in that the third medium makes a phase transition from the liquid phase to the gaseous phase inside the heat exchange device. This serves to counter the associated substantial increase in the volume occupied by the second medium.

The heat exchange device according to the invention can especially preferably be configured as a multi-layered plate heat exchanger. For this purpose, a plurality of first media channels, second media channels and third media channels can be provided, whereby at least the second media channels and the third media channels are each formed in a plate, and whereby the plates that form the second media channels are each arranged between two plates that each form a third media channel, and whereby a plate that forms a first media channel is arranged between two plates that each form a third media channel.

Additional advantages can be achieved by means of the intermediate circuit provided for the drive unit according to the invention. One of these can lie in the simple and advantageous integration of a heat storage tank that is provided in order to absorb thermal energy from the exhaust gas (via the transfer medium) and to release the thermal energy to the working medium.

BRIEF DESCRIPTION OF THE DRAWINGS

The invention is explained in greater detail below with reference to the embodiments presented in the drawings. The drawings show the following.

DETAILED DESCRIPTION OF THE INVENTION

Figure 1:
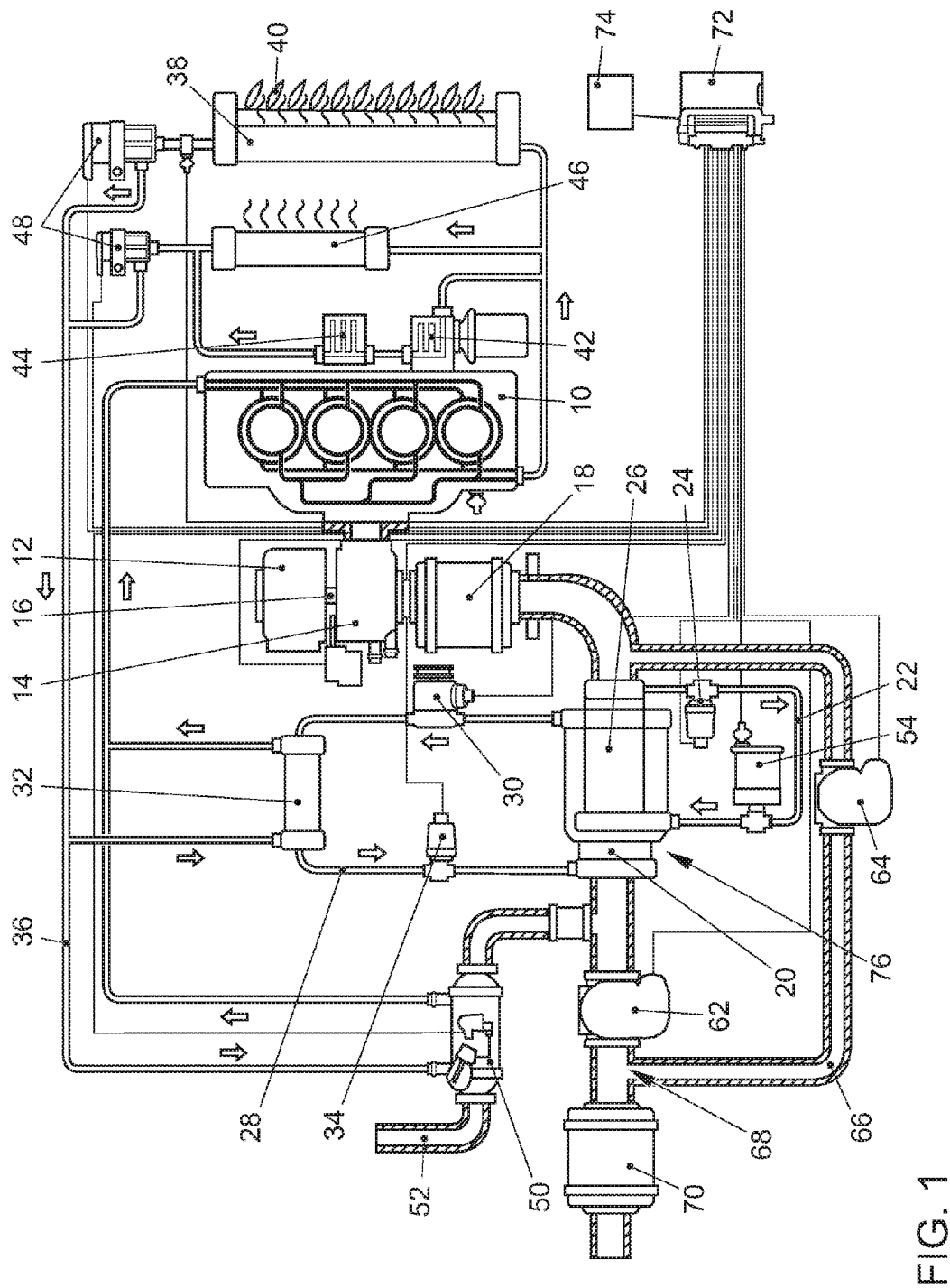
FIG. 1 a drive unit according to the invention, for a motor vehicle, in a schematic view.

The drive unit shown in FIG. 1 for a motor vehicle comprises a combustion machine in the form of an internal combustion engine 10 that is configured, for example, as a four-cylinder reciprocating diesel engine. Thus, there are four cylinders in the internal combustion engine 10, whereby a movable piston is arranged in each of these cylinders. Together with the walls of the associated cylinder, each piston forms a combustion chamber in which compressed fresh gas (air) is combusted with directly injected fuel.

The fresh gas is fed to the internal combustion engine via a fresh gas system, most of which is not shown here. The fresh gas is compressed by means of the compressor 12 of an exhaust gas turbocharger.

The exhaust gas generated during the combustion of the fresh gas with the fuel is discharged from the internal combustion engine 10 via an exhaust gas system. In this process, the exhaust gas first flows through a turbine 14 of the exhaust gas turbocharger that is connected to the compressor 12 via a shaft 16 and subsequently through a first exhaust gas treatment device 18 such as, for example, a catalytic converter. Downstream from the first exhaust gas treatment device 18, a first heat exchange device—configured according to the invention—of a cyclic device is integrated into the exhaust gas system.

The first heat exchange device of the cyclic device is configured in such a way that it integrates a first heat exchanger 20 and a second heat exchanger 26 into a three-medium heat exchanger, which is concretely configured as a three-medium evaporator 76. The exhaust gas as the first medium, the working medium of the working circuit 28 as the second medium, and the transfer medium of an intermediate circuit 22 as the third medium all flow through the three-medium evaporator 76. Here, it is provided that, through an appropriate arrangement of the channels of the three-medium evaporator 76—which carry the individual media—the transfer medium is present at least in one section of a shared flow path of the exhaust gas and of the working medium between the exhaust gas and the working medium, so that this transfer medium or the intermediate circuit 22 can fulfill the function of a heat damper and heat buffer.

The heat transfer from the exhaust gas to the working medium can bring about an evaporation and superheating of the working medium in the three-medium evaporator 76. In a clockwise cycle of the cyclic device, the superheated steam can then be expanded in an expansion device 30, a process in which mechanical power is generated that can be used to generate electrical energy and/or to directly drive the vehicle mechanically in order to assist the internal combustion engine 10 or ancillary components of the combustion machine. In a second heat exchange device of the cyclic device, which, in the present embodiment, comprises only a heat exchanger 32 configured as a condenser, the working medium is then cooled off and changed back into the liquid phase (condensed). A media pump 34 of the working circuit then ensures that the liquid working medium is once again fed to the three-medium evaporator 76.

Not only the working medium but also the liquid coolant of an engine coolant circuit 36 flow through the condenser, a process in which a heat transfer from the working medium to the coolant takes place during the clockwise cycle. Consequently, the waste heat from the clockwise cycle can especially be discharged to the ambient air via a main cooler 38 of the drive unit. Here, the amount of ambient air flowing through the main cooler 38 can be automatically set by means of adjustable cooler vanes 40.

In addition to this, the waste heat from the clockwise cycle in the engine coolant circuit 36 can be used to more quickly bring the coolant to the operating temperature after a cold start of the combustion machine or, to the greatest extent possible, to maintain the operating temperature during operating phases of the internal combustion engine 10 at low loads. This can prevent a drop in the temperature of the internal combustion engine 10 as well as of additional components such as, for example, an engine cooler 42 (and thus the motor oil) and a transmission oil cooler 44 (and thus the transmission oil). Moreover, the waste heat from the clockwise cycle can be utilized to improve the heating effect of a heating system for the interior of the motor vehicle. For this purpose, a heat exchanger 46 of the heating system is integrated into the engine coolant circuit 36.

The flow of coolant through individual components of the engine coolant circuit 36 can be controlled as needed by appropriately actuating valves (not shown here) as well as two coolant pumps 48 that are integrated into the engine coolant circuit 36. In particular, cooling of the coolant in the main cooler 38 can be prevented during the warm-up phase after a cold start as well as during continuous operation of the internal combustion engine 10 at very low loads, as a result of which the operating temperature of the coolant can be reached as quickly as possible or maintained.

The coolant of the engine coolant circuit 36 also flows through a cooler 50 of a low-pressure exhaust gas return line 52. The low-pressure exhaust gas return line 52 branches off from the exhaust gas system downstream from the first heat exchanger 20 of the first heat exchange device. Shut-off valves can prevent the coolant from flowing through the cooler 50 of the low-pressure exhaust gas return line 52, whereby all of the coolant is then fed via the condenser (the heat exchanger 32) of the cyclic device.

The drive unit also comprises a heat storage tank 54 configured as a latent heat storage tank that can absorb thermal energy from the transfer medium, can store it for a prolonged period of time, and can release it to the transfer medium once again as needed. In particular, it can be provided that the heat storage tank absorbs thermal energy from the transfer medium when the internal combustion engine 10 is being operated at high loads. The thermal energy that can be transferred in the first heat exchanger 20 from the exhaust gas to the transfer medium can then be greater than the thermal energy that can then be transferred in the clockwise cycle. The excess thermal energy can be advantageously used to "charge" the heat storage tank 54.

In contrast, if the internal combustion engine 10 is operated during the warm-up phase or at low loads, the thermal energy that is transferred in the first heat exchanger 20 to the transfer medium can be less than the thermal energy that can be transferred in the clockwise cycle. In particular, this thermal energy can be so low that it is not sufficient to evaporate and superheat the working medium in the evaporator. Then, by appropriately actuating the heat storage tank 54, the thermal energy stored therein can first be transferred to the transfer medium and then—in the evaporator—to the working medium. This serves to assist the clockwise cycle or to even make it possible in the first place.

If the thermal energy transferred from the heat storage tank 54 and/or from the exhaust gas to the transfer medium is insufficient to ensure the evaporation of the working medium, then the working circuit 28 can also be used as a transfer circuit, so that, in this case, no clockwise cycle is carried out and accordingly, no mechanical power is generated by the expansion device 30, but thermal energy can continue to be transferred from the exhaust gas and/or from the heat storage tank 54 to the coolant of the engine coolant circuit 36. In order to prevent that there is a need for the working medium—which then serves as the transfer medium—to flow through the unused expansion device 30, a bypass line (not shown here) can be provided in order to bypass the expansion device 30.

The exhaust gas system also comprises a first exhaust gas flap 62 that is integrated into a main line of the exhaust gas system downstream from the first heat exchanger 20 and from the branch of the low-pressure exhaust gas return line 52, and it also comprises a second exhaust gas flap 64 that is integrated into a bypass line 66 that bypasses the first heat exchanger 20, the branch of the low-pressure exhaust gas return line 52, and the first exhaust gas flap 62. By means of the exhaust gas flaps 62, 64, the exhaust gas flow can be made to partially or completely bypass the first heat exchanger 20 and the low-pressure exhaust gas return line 52 via the bypass line 66 on an as-needed basis. This can especially be done when, after a cold start, a second exhaust gas treatment device 70 (for example, a diesel particulate filter), which is arranged downstream from the feed opening 68 of the bypass line 66, has to first be brought up to the operating temperature as quickly as possible, when there is a need to avoid the exhaust gas counter-pressure—at times substantial—that the first heat exchanger 20 can bring about, or when the exhaust gas energy supply is so large that some of the exhaust gas has to bypass the evaporator for temperature-protection reasons.

All of the actuatable components of the drive unit are actuated by an engine control device 72. These components are thus preferably configured so that they can be activated and operated electrically, but they can also be operated pneumatically or hydraulically, for which purpose actuators that can be actuated electrically and that function pneumatically or hydraulically can be provided.

The components can be actuated by the engine control device 72 as a function of signals of a navigation system 74 of the drive unit or of the motor vehicle. Consequently, among other things as a function of a predicted trip profile, it can be provided that the heat storage tank 54 is charged or discharged in order to achieve the best possible utilization of the thermal energy of the exhaust gas.

Figure 6:
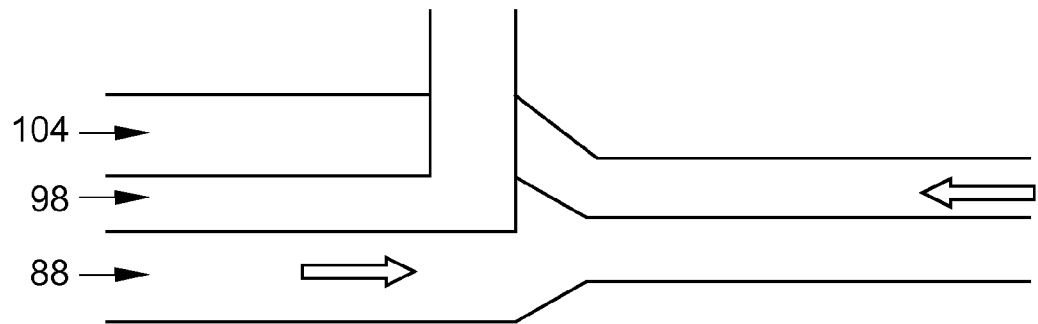
FIG. 6 a schematic diagram of the heat exchange device of FIGS. 2 to 5.
Figure 7:
FIG. 7 a schematic diagram of an alternative heat exchange device according to the invention.

Schematic diagrams of the mode of operation of the three-medium heat exchanger or of the three-medium evaporator 76 are shown in FIGS. 6 and 7.

Here, FIG. 6 shows a schematic diagram of a three-medium heat exchanger in which the transfer medium is present along the entire flow path between the exhaust gas and the working medium.

In FIG. 7, in contrast, the media channel that conveys the transfer medium extends only over a first section of the flow path, so that, in a second section, a direct heat transfer from the exhaust gas to the working medium is possible. Here, it is provided that the first section is arranged on the input side of the three-medium heat exchanger relative to the exhaust gas flow. As a result, the transfer medium functions as a heat damper in the first section in which the exhaust gas can still have such a high temperature that this could lead to a negative effect on the working medium, whereas in the second section, in which the exhaust gas has already been cooled off to a safe temperature, a direct heat transfer to the working medium is provided. Due to the resultant greater temperature differential between the two heat-exchanging media, the total heat transfer in the three-medium heat exchanger can be improved.

Figure 2:
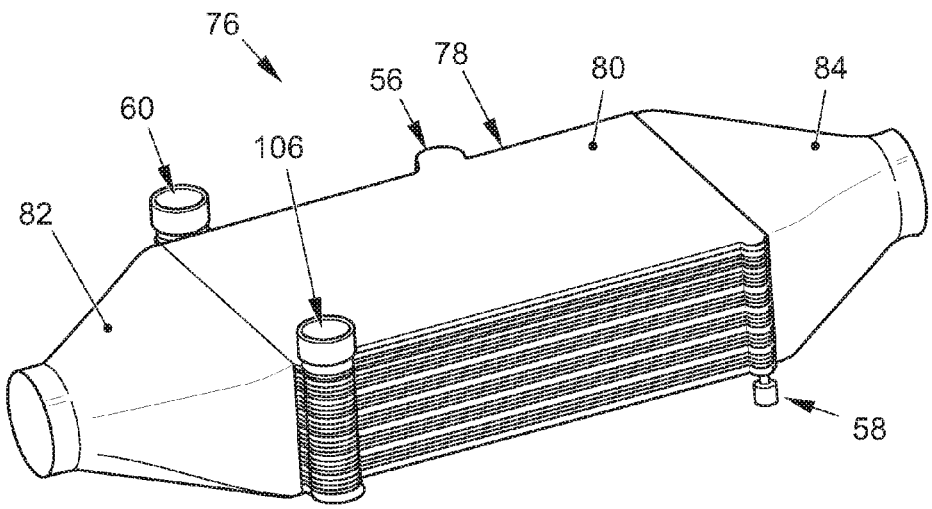
FIG. 2 a heat exchange device according to the invention, in a perspective view.
Figure 3:
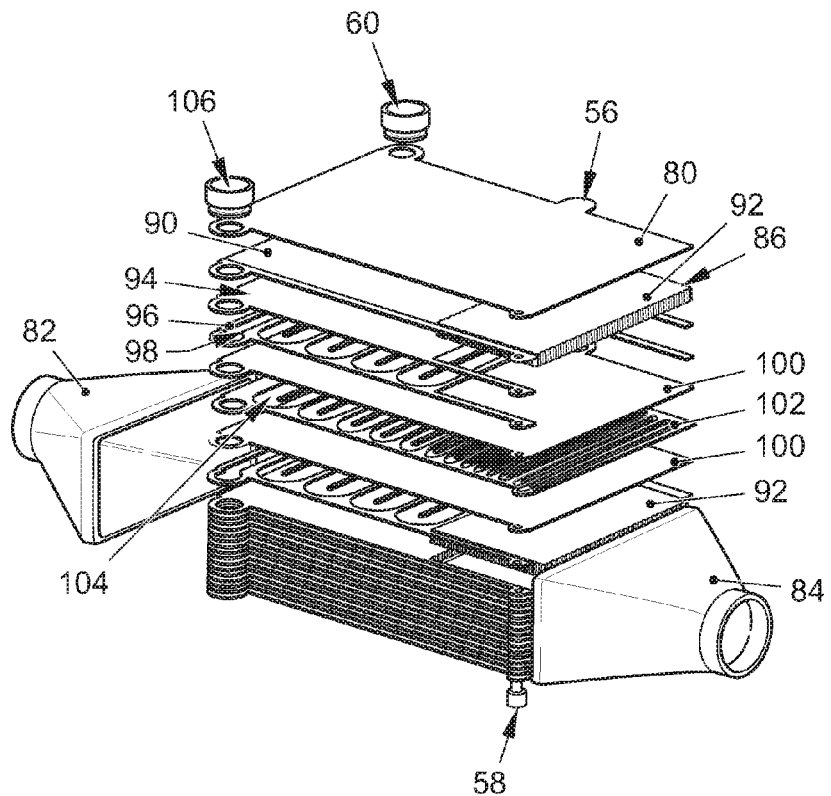
FIG. 3 the heat exchange device, in an exploded view.
Figure 4:
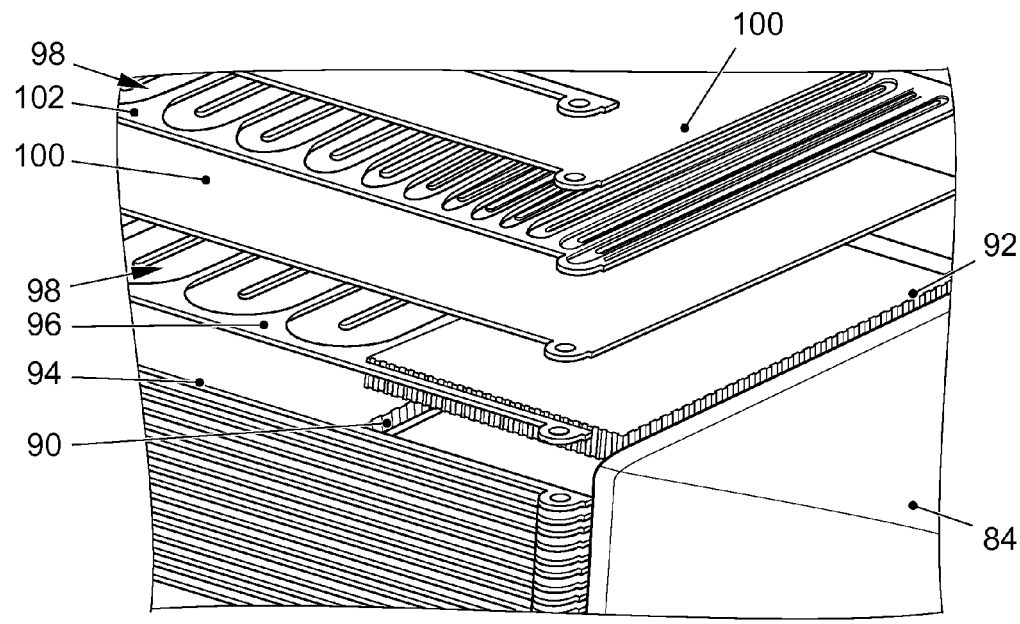
FIG. 4 an enlarged section of FIG. 3.

In both embodiments, it is provided that the flow directions of the exhaust gas and of the working medium are opposite to each other. The transfer medium can flow in both directions here. In the drive unit according to FIG. 2, the flow direction of the transfer medium is the same as that of the working medium.

FIGS. 2 to 5 show an embodiment of a three-medium evaporator corresponding to the schematic diagram according to FIG. 6.

The three-medium evaporator is configured as a multi-layered plate heat exchanger, whereby the individual plates form one or more media channels for the specific medium that is flowing through them. The plates, which are layered one above the other, form a block 78 of the three-medium evaporator 76 in which the heat exchange takes place. At the top and bottom, the block 78 is delimited by two cover plates 80. On the inlet and outlet sides, the block 78 is followed by an inlet funnel 82 and by an outlet funnel 84 for the exhaust gas via which the three-medium evaporator 76 can be integrated into a pipe network of an exhaust gas system.

Figure 5:
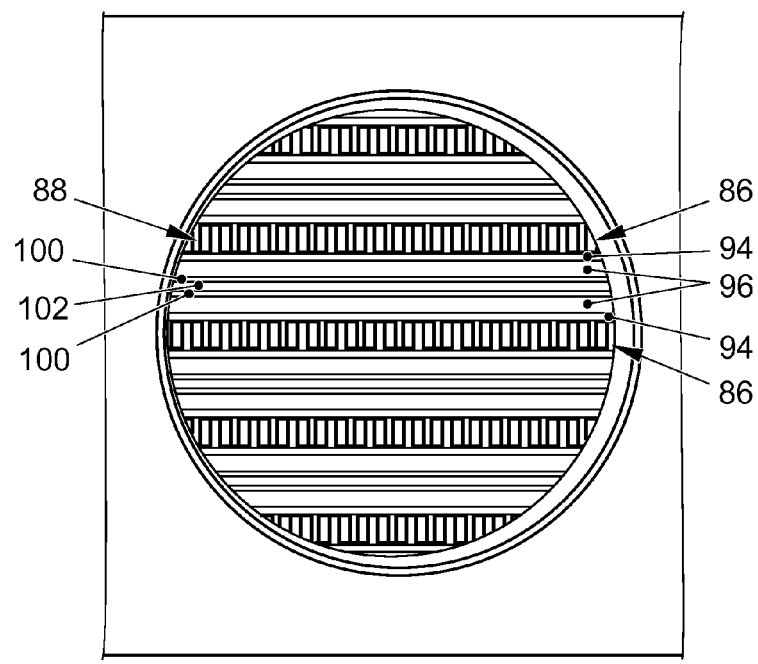
FIG. 5 the heat exchange device, in a front view.

The exhaust gas that enters through the inlet funnel 82 flows through the exhaust gas plates 86 that are provided to carry the exhaust gas through the block 78, said exhaust gas plates 86 forming a plurality of small media channels 88 for the exhaust gas, as can be seen especially clearly in FIG. 5. Due to the plurality of small media channels 88, the contact surface area between the exhaust gas and the exhaust gas plates 86 can be configured to be large, thereby ensuring sufficient heat transfer from the exhaust gas while taking into account the relatively poor heat transfer coefficient of the exhaust gas. The exhaust gas plates 86 form two sections that differ in terms of the their thickness. In a first section 90, which is adjacent to the inlet funnel 82, the plate thickness is less than in a second section 92, which is adjacent to the outlet funnel 84. As seen in the layering direction, each exhaust gas plate 86 is followed on both sides either by a cover plate 80 (on the outside of the two outermost exhaust gas plates 86) or else by a first intermediate plate 94. The first intermediate plates 94 are configured in such a way that they have cutouts in the section that is congruent with the second section 92 of the exhaust gas plates 86.

A transfer medium plate 96 is arranged on the side of each first intermediate plate 94 facing away from the exhaust gas plate 86. These transfer medium plates 96 each form a media channel 98 that is open on both sides in the layering direction and that extend in a sinuous or meandering manner between an inlet section and an outlet section. Here, the transfer medium plates 96 likewise have cutouts in the section that is congruent with the second section 92 of the exhaust gas plates 86.

On each side of each transfer medium plate 96 facing away from the first intermediate plate 94, there is a second intermediate plate 100 that covers the entire horizontal cross section of the block 78 and thus also the second section 92 of the exhaust gas plates 86.

The thickness of the second section 92 of each exhaust gas plate 86 is configured in such a way that said exhaust gas plate 86 extends through the cutouts of the adjacent first intermediate plate 94 and through the transfer medium plate 96 and contacts the adjacent second intermediate plate 100 in the appertaining section.

On each side of each second intermediate plate 100 facing away from the transfer medium plate 96, there is a working medium plate 102. These working medium plates 102 each form a media channel 104 that is open on both sides in the layering direction and that extend in a sinuous or meandering manner between an inlet section and an outlet section for the working medium. Here, the working medium plates 102 cover the entire horizontal cross section of the block 78 and the media channels 104 utilize the entire horizontal cross section of the block 78 as completely as possible.

The above-mentioned layering is a layered structure that, with its alternating layering directions, forms the block 78 with its multiple layers. Each working medium plate 102 is thus surrounded on both sides by a second intermediate plate 100, each followed by a transfer medium plate 96, then by a first intermediate plate 94, then by an exhaust gas plate 86, and then either once again by a working medium plate 102 or else by a cover plate 80.

Owing to the cutouts in the first intermediate plates 94 and in the transfer medium plates 96 for the second section 92 of the exhaust gas plates 86, the heat transfer between the exhaust gas and the working medium in the second section of the heat exchanger is direct (except for where second intermediate plates 100 have been inserted, which is necessary for the physical separation of the exhaust gas and the working medium), as is schematically shown in FIG. 7.

The media channels 104 formed by the working medium plates 102 widen continuously, starting from the inlet sections all the way to the outlet sections. As a result, the increase in the volume of the working medium during the change from the liquid to the gaseous phase is taken into account.

Inlets and outlets for the transfer medium and for the working medium are formed by overlapping passage openings that extend in the layering direction in all of the plates (only partially in the cover plates) which, in the case of the inlet 56 and the outlet 106 for the transfer medium, are connected to the associated media channel 98 in each of the transfer medium plates 96 and, in the case of the inlet 58 and the outlet 60 for the working medium, are connected to the associated media channel 104 in each of the working medium plates 102.

LIST OF REFERENCE NUMERALS

10 internal combustion engine
12 compressor of the exhaust gas turbocharger
14 turbine of the exhaust gas turbocharger
16 shaft of the exhaust gas turbocharger
18 first exhaust gas treatment device
20 first heat exchanger of the first heat exchange device
22 intermediate circuit
24 media pump of the intermediate circuit
26 second heat exchanger of the first heat exchange device
28 working circuit
30 expansion device
32 second heat exchanger of the second heat exchange device
34 media pump of the working circuit
36 engine coolant circuit
38 main cooler
40 vanes
42 engine oil cooler
44 transmission oil cooler
46 heat exchanger of the heating system
48 coolant pump
50 cooler of the low-pressure exhaust gas return line
52 low-pressure exhaust gas return line
54 heat storage tank
56 inlet for the transfer medium
58 inlet for the working medium
60 outlet for the working medium
62 first exhaust gas flap
64 second exhaust gas flap
66 bypass line of the exhaust gas system
68 feed opening
70 second exhaust gas treatment device
72 engine control device
74 navigation system
76 three-medium evaporator
78 block
80 cover plate
82 inlet funnel
84 outlet funnel
86 exhaust gas plate
88 media channel in an exhaust gas plate
90 first section of an exhaust gas plate
92 second section of an exhaust gas plate
94 first intermediate plate
96 transfer medium plate
98 media channel in a transfer medium plate
100 second intermediate plate
102 working medium plate
104 media channel in a working medium plate
106 outlet for the transfer medium

The invention claimed is:
1. A heat exchange device having:
a first media channel for a first medium,
a second media channel for a second medium,
a third media channel for a transfer medium arranged in a first section of the heat exchange device between the first media channel and the second media channel, so that, in said first section, a heat transfer from the first medium to the second medium takes place via the transfer medium, whereas, in a second section, a heat transfer from the first medium to the second medium takes place directly, and
a plurality of plates,
wherein:
the first medium is provided as an exothermic medium, and the second medium is provided as an endothermic medium, each of the second media channel and the third media channel is formed in one of the plurality of plates, and the plate that forms the third media channel is smaller than the plate that forms the second media channel, so that, in said first section of the heat exchange device, the exothermic medium flows around the plate that forms the third media channel and, in said second section, the exothermic medium flows around the plate that forms the second media channel.

2. The heat exchange device according to claim 1, wherein each of the first and second media channels has an intended flow direction, and wherein the intended flow direction in the first media channel is opposite to the intended flow direction in the second media channel.

3. The heat exchange device according to claim 1, wherein each of the second and third media channels has an intended flow direction, and wherein the intended flow direction in the third media channel is the same as the intended flow direction in the second media channel.

4. The heat exchange device according to claim 1, wherein the second media channel has an intended flow direction, and wherein the second media channel widens in its intended flow direction.

5. The heat exchange device according to claim 1, wherein the first media channel, the second media channel and the third media channel comprise, respectively, a plurality of first media channels, second media channels and third media channels, whereby the second media channels and the third media channels are each formed in at least one of the plurality of plates, and whereby plates that form the second media channels are each arranged between two plates that each form the third media channel, and whereby a plate that forms the first media channel is arranged between two plates that each form the third media channel.

* * * * *